(12) United States Patent
Smith et al.

(10) Patent No.: US 7,444,721 B2
(45) Date of Patent: Nov. 4, 2008

(54) FOUR LEGGED FASTENER CLIP

(75) Inventors: Michael Walter Smith, Lake Zurich, IL (US); Daniel James Dickinson, Arlington Heights, IL (US)

(73) Assignee: Termax Corporation, Lake Zurich, IL (US)

( * ) Notice: Subject to any disclaimer, the term of this patent is extended or adjusted under 35 U.S.C. 154(b) by 0 days.

(21) Appl. No.: 11/739,579

(22) Filed: Apr. 24, 2007

(65) Prior Publication Data

US 2007/0186389 A1    Aug. 16, 2007

Related U.S. Application Data (60) Continuation-in-part of application No. 11/277,107, filed on Mar. 21, 2006, which is a continuation-in-part of application No. 10/906,209, filed on Feb. 9, 2005, now Pat. No. 7,178,850, and a continuation-in-part of application No. 10/704,094, filed on Nov. 7, 2003, which is a division of application No. 10/164,963, filed on Jun. 7, 2002, now Pat. No. 6,718,599.

(60) Provisional application No. 60/353,515, filed on Feb. 1, 2002, provisional application No. 60/327,814, filed on Oct. 9, 2001, provisional application No. 60/301,364, filed on Jun. 25, 2001.

(51) Int. Cl.
    *F16B 5/12*    (2006.01)
(52) U.S. Cl. ..................................... 24/297
(58) Field of Classification Search ........... 24/289–295, 24/297, 458, 453, 666, 667, 701, 702, 669; 411/508–511, 45–48, 182, 480, 533, 902, 411/903, 349, 913, 112, 173–175; 403/397, 403/408.1, 326; 52/716.7, 718.06, 716.5, 52/716.6, 716.8, 718.03, 704; 174/138 D; 296/146.7, 39.1, 214
See application file for complete search history.

(56) References Cited

U.S. PATENT DOCUMENTS

| 5,966,782 | A | * | 10/1999 | Ishihara et al. ................. 24/297 |
| 6,074,150 | A | * | 6/2000 | Shinozaki et al. ........... 411/508 |
| 6,101,686 | A | * | 8/2000 | Velthoven et al. ............. 24/295 |
| 6,381,811 | B2 | | 5/2002 | Smith |
| 6,405,413 | B2 | * | 6/2002 | Ichimaru et al. .............. 24/297 |
| 6,449,814 | B1 | * | 9/2002 | Dinsmore et al. ............. 24/297 |
| 6,671,934 | B2 | * | 1/2004 | Wenzlick et al. .............. 24/295 |
| 6,691,380 | B2 | | 2/2004 | Vassiliou |
| 6,796,006 | B2 | | 9/2004 | Hansen |
| 6,868,588 | B2 | | 3/2005 | Dickinson |
| 2004/0083582 | A1 | | 5/2004 | Dickinson |
| 2005/0217082 | A1 | | 10/2005 | Vassiliou |
| 2005/0246870 | A1 | | 11/2005 | Dickenson |

* cited by examiner

*Primary Examiner*—James R Brittain (57) ABSTRACT

A fastener clip includes a pair of laterally offset legs joined at a head portion, wherein the legs form a clip opening at an opposite end of the head portion. A pair of arms are coupled to the pair of legs adjacent to the head portion such that the arms move substantially independently from the pair of legs, wherein the arms project toward the clip opening to form a frictional opening and to permit insertion or withdrawal of a post such that the post causes a non-compressive force between the arms when the post is withdrawn. The post may be a blade, post or tower on a body panel or any suitable flat post. The fastener clip is operative for insertion into a hole defined in a first engagement structure, such as a vehicle chassis.

27 Claims, 7 Drawing Sheets

FOUR LEGGED FASTENER CLIP

RELATED APPLICATIONS

This application is a continuation-in-part of prior application Ser. No. 11/277,107, having a filing date of Mar. 21, 2006, entitled "Multicontact Adaptive Fastener Clip", which is a continuation in part of U.S. patent application Ser. No. 10/906,209 filed on Feb. 9, 2005, now U.S. Pat. No. 7,178,850 the entire disclosure of which is incorporated herein by reference, and a continuation in part of U.S. patent application 10/704,094 entitled, "Vehicles Comprising Assemblies Having Fastener with Ergonomically Balanced Removal to Insertion Force Ratio", filed Nov. 7, 2003 which is a divisional Application of non-provisional application Ser. No. 10/164,963, filed Jun. 7, 2002, now U.S. Pat. No 6,718,599, which claims priority to provisional applications 60/301,364, filed Jun. 25, 2001, 60/327,814, filed Oct. 9, 2001, and 60/353,515 filed Feb. 1, 2002, all of which are incorporated herein by reference in their entirety.

FIELD OF THE INVENTION

The invention relates generally to devices for fastening objects, and more particularly to a fastener clip for insertion into an engagement structure, such as a vehicle chassis, a hollow substrate, a wall, a plate or any suitable surface.

BACKGROUND OF THE INVENTION

A number of devices and fasteners are currently available for fastening panels, such as body panels and automobile interior trimpiece panels, to the chassis of a vehicle. As used herein, a body panel refers to, for example, any interior or exterior body panel on a vehicle, a plastic interior trimpiece or any interior trimpiece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

These body panels typically are required to attach to the chassis of an automobile with a relatively low level of insertion force while providing a high level of extraction force suitable to maintain attachment of the panel to the chassis. However, these conventional fastener devices instead provide approximately relatively equal levels of insertion and extraction force. Further, once the body panel is attached to the chassis via the fastener device, the fastener device is typically required to secure the panel to the chassis under a variety of environmental conditions, such as in the presence of vibration at various levels of amplitude and frequency. For example, the fastener device should prevent or minimize the amount of buzzing, rattling or any other type of noise that may cause attention to the occupants of the vehicle or otherwise weaken the attachment. Further yet, another requirement of the fastener device is that the fastener device accommodates various levels of production tolerances, such as various dimensions amongst, for example, the body panels as well as the vehicle chassis. Conventional fastener devices typically do not adequately minimize or eliminate buzzing and rattling and do not sufficiently accommodate variations in production tolerances.

Fastener clips are known for attaching body panels to an automobile chassis. For example, fastener clips are known for including a pair of retaining tabs extending inwardly from a tab aperture formed in a bottom portion of a pair of legs. The retaining tabs are inclined toward the bottom ends of the legs to permit a blade fastener to be inserted resulting in a withdrawal force applied to the blade fastener that is opposed by the retaining tab such that all of the withdrawal force is borne by the retaining tabs in compression. However, the arm length is relatively shorter and stubbier than the leg length so that the arms can withstand the compression force sustained by the arms. As a result, the shorter and stubbier arms require a relatively high insertion force and further place a relatively high minimum insertion force limit. Thus, this known clip limits the insertion force to a relatively high level leading ultimately to more difficulty with inserting the clip causing problems related to repetitive stress syndrome and other worker related ailments.

If the tolerances in production of the slot in the vehicle chassis or in the trim-piece exist, for example, then engagement of one portion of the hole in the chassis with one of the arms may not provide suitable frictional engagement or otherwise result in movement. Further, less than all four of the arms will make suitable engagement with the slot of the vehicle chassis. Twisting of the body panel will be likely more prevalent because less than four contact points are actually made with the slot of the vehicle chassis. As a result, wear, squeaks, rattles, buzzing, corrosion and loss of elasticity and loss of sealing may result, especially after years of vehicle operation and exposure to vibration and other environmental conditions.

DETAILED DESCRIPTION OF THE PREFERRED EMBODIMENTS

A fastener clip includes a pair of laterally offset legs joined at a head portion. The legs form a clip opening at an opposite end of the head portion. A pair of arms are coupled to the pair of legs adjacent to the head portion such that the arms move substantially independently from the pair of legs, wherein the arms project toward the clip opening to form a frictional opening and to permit insertion or withdrawal of a post such that the post causes a non-compressive force between the arms when the post is withdrawn. The post may be a blade, post or tower on a body panel or any suitable flat post. For example, the post may be flat or have a flat portion. The body panel may be constructed from plastic or from any suitable material such as wood, steel, aluminum, magnesium, carbon fiber or any suitable material. The fastener clip is operatively inserted into a hole defined in a first engagement structure, such as a vehicle chassis. According to one embodiment, the fastener clip is made of: plastic, acetal, polyacetal, polyoxymethylene, nylon, fiberglass and/or carbon fiber, however any suitable material may be used in any combination such as steel, tin and/or any suitable metal. The fastener clip dampens vibrations and thus eliminates or substantially reduces buzz, squeak and rattles. Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip may be made of anti-corrosive material such as plastic or treated metal to provide long reliable service life.

Among other advantages, the fastener clip relatively easily and securely facilitates attachment of the body panel, such as an interior or exterior body panel, with the first engagement structure, such as the vehicle chassis. The pair of arms project toward the clip opening, to create a frictional opening upon insertion or withdrawal of a post such that the post causes a non-compressive force between the arms when the post is withdrawn. For example, the post imparts a force substantially in-line with the pair of arms upon insertion or withdrawal of a post.

The arms move substantially independently from the pair of legs and thus the arms may engage the post whether the legs are inserted into a slot of a second engagement structure or not. For example, the independent arms provide relatively easy insertion force while maintaining a high level of extraction force. Further, the arms and/or legs may be tapered to further allow greater movement of the legs and/or arms. Since the arms are independent from the legs, the designer of the fastener clip has the freedom to design the desired level of insertion force and extraction force. For example, lengthening the arms decreases the insertion force for entry into the post while lengthening the legs decreases the insertion force for entry into the chassis slot since increasing length provides more leverage. In contrast, conventional fasteners have shorter, stubbier arms and/or legs. Additionally, the independent arms allow the designer to select any suitable retention force by adjusting the size of the depression. The prior art has prongs coupled to the legs and during insertion; the legs compress the prongs, thus increasing the insertion force.

The fastener clip resists rotation and pivoting within the hole of the vehicle chassis, and thus the fastener clip may maintain a high level of extraction force relative to an insertion force. For example, the fastener clip may withstand both forces applied in a direction perpendicular from the vehicle chassis as well as moment forces applied to the fastener clip when engaged in the vehicle chassis. Further, the fastener clip resists reductions in extraction force. Also, the fastener clip retains grip in the presence of the combination of forces perpendicular to the vehicle chassis as well as moment forces relative to any direction with respect to the fastener clip and the vehicle chassis.

According to one embodiment, the four engagement portions include depressed portions to further resist pivoting or rotation of the fastener clip while engaged in the hole of the vehicle chassis. As a result, the depressed portion provides reliable engagement with the first engagement structure and can adapt to variations and production tolerances, such as variations in the slot formed within the vehicle chassis and variations in body panels. For example, the engagement portion adapts to variations in thickness and dimension of vehicle body panels holes, slots, posts and/or tabs. Each leg independently engages a slot of the vehicle chassis and adapts to changes such as vehicle chassis flexing and vibrations. Further, the engagement portion, along with the accompanying depressed portion on each leg, permits relatively easy insertion of the fastener clip into a slot formed within the vehicle chassis while providing a relatively high level of extraction force from the vehicle chassis.

The assembly of the body panel onto the vehicle chassis requires a relatively low level of insertion force, and therefore provides many ergonomic advantages. For example, the relatively low level of insertion force is particularly advantageous for assembly line operators who repetitively insert body panels onto the vehicle chassis. The relatively low level of insertion force required for inserting the body panel into the vehicle chassis results in fewer injuries to the assembly workers, including injuries related to repetitive stress syndrome. Additionally, the relatively high level of extraction force characteristic of the fastener clip assures secure attachment of the body panel to the vehicle chassis as previously described.

Further, the fastener clip continuously adapts to changes in environmental conditions such as vehicle flexing, vibration and thermal expansion. For example, the fastener clip may adapt to changes in thermal expansion, especially due to the differences in thermal expansion rates between dissimilar metals with respect to the vehicle chassis components and/or between plastic components such as the interior trim panels attached to the metal vehicle chassis. According to one embodiment, the depressed portion continuously adapts to variations in thickness and dimensions of the vehicle body panel slots and/or tabs in the body panel and other variations. Each leg independently engages the slot of the vehicle chassis in a continuous and/or discrete manner. Each leg adapts to changes, such as chassis flexing and vibrations of a wide range of amplitudes and frequencies. Since the fastener clip securely attaches a body panel to the vehicle chassis, the fastener clip improves reliability both in the short term and in the long term while further improving vehicle safety and quality.

Yet another advantage is that the fastener clip is relatively easy to manufacture using relatively inexpensive manufacturing processes and materials. For example, the fastener clip may be molded from plastic without the need for action. The use of the fastener clip decreases production costs, increases worker productivity and efficiency and decreases overall vehicle assembly costs.

Figure 1:
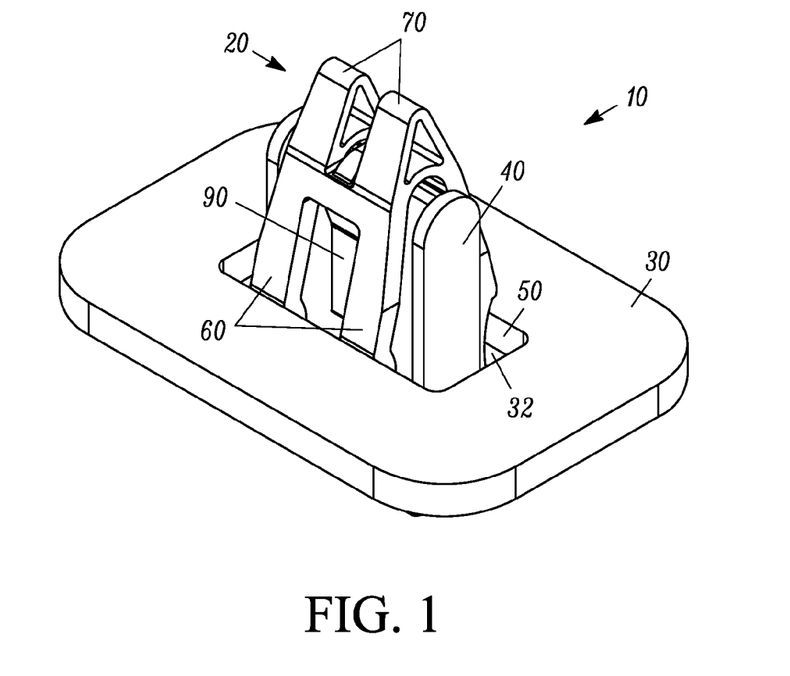
FIG. 1 is a perspective view of a body panel assembly in accordance with an exemplary embodiment.

FIG. 1 is a perspective view of a body panel assembly 10 including a fastener clip 20 for insertion into a first engagement structure 30 having a hole 32. The fastener clip 20 is operatively inserted into a hole 32 defined in a first engagement structure 30, such as a vehicle chassis. The fastener clip 20 is also fastened to a body panel 31 having a second engagement structure 40, such as a tower, post portion or mounting portion of the body panel 31. The second engagement structure 40 may be part of a plastic trimpiece, such as the body panel 31 or any other suitable type of body panel. The fastener clip 20 includes a pair of laterally offset legs 60 joined at a head portion 70. The legs 60 form a clip opening 80 at an opposite end of the head portion 70. Each arm 90 is coupled to each leg 60 such that the pair of arms 90 are coupled to the pair of legs 60 adjacent to the head portion 70. The arms 90 move substantially independently from the pair of legs 60, wherein the arms 90 project toward the clip opening 80 to form a frictional opening 100, 1060 upon insertion or withdrawal of the post 40 such that the post 40 causes a non-compressive force between the arms 90 when the post 40 is withdrawn. The post 40 may be a blade post or tower on the body panel 31 or any suitable flat post with a slot suitable for engaging arms 90.

Figure 2:
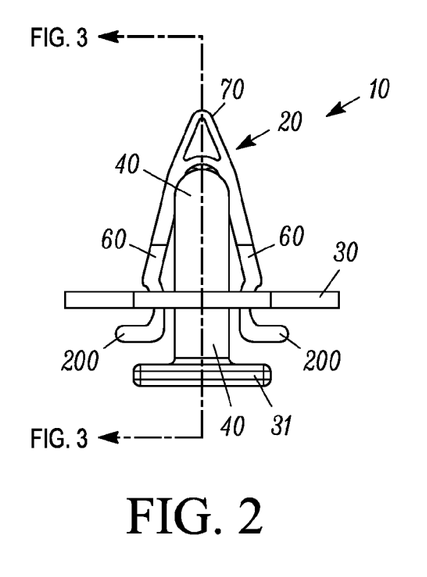
FIG. 2 is a side view of the body panel assembly according to one embodiment.

FIG. 2 is a side view of the body panel assembly 10. According to one embodiment, the second engagement structure 40 and/or body panel 31 may be a plastic trimpiece cover for a B-pillar in a vehicle chassis and may be made out of polyvinyl chloride, plastic, acetal, polyacetal, polyoxymethylene, nylon, fiberglass, carbon fiber and/or any other suitable type of material as is known in the art. Alternatively, the fastener clip 20 may attach the second engagement structure 40 and/or body panel 31 to an A-pillar, C-pillar, D-pillar, E-pillar or any other suitable pillar within the vehicle. Typically, an A-pillar refers to the first pillar from the front of a vehicle (i.e., a windshield pillar); B-pillar refers to the second pillar from the front of the vehicle; C-pillar refers to a third pillar from the front of the vehicle, if applicable; and so on.

Figure 3:
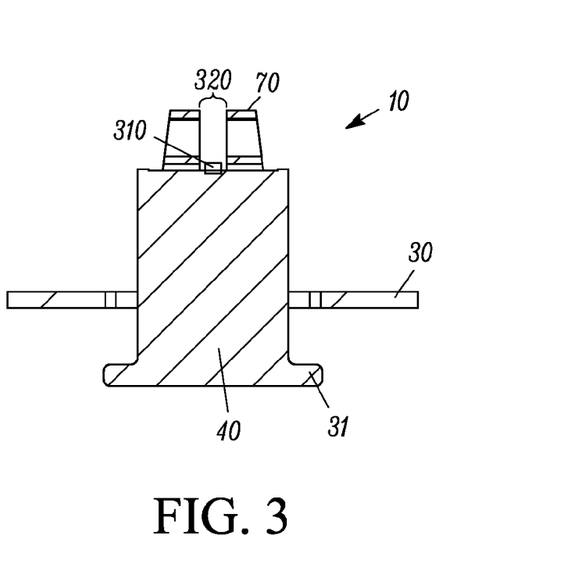
FIG. 3 is a cut away view of the body panel assembly shown in FIG. 2.

FIG. 3 is a cut away view of the body panel assembly 10 taken from line B-B shown in FIG. 2. According to one embodiment, the fastener clip 20 further includes a spring finger 310 formed in the head portion 70 wherein the spring finger 310 is operative to engage the post 40 when inserted. The spring finger 310 controls the distance the post 40 may be inserted past the frictional opening 100 (FIG. 7), 1060 and reduced movement of the post 40 within the arms 90 and/or the spring finger 310. For example, the post 40 is operative to compresses the spring finger 310 upon insertion and contact with the spring finger 310 and thus the spring finger 310 reduces movement and/or play between the post 40 and the arms 90 and/or the spring finger 310. According to one embodiment, a spring window 320 is formed in the head portion 70 such that the spring finger 310 bridges the pair of laterally offset legs 60. The spring finger 310 springs in response to contact with the post 40.

Figure 4:
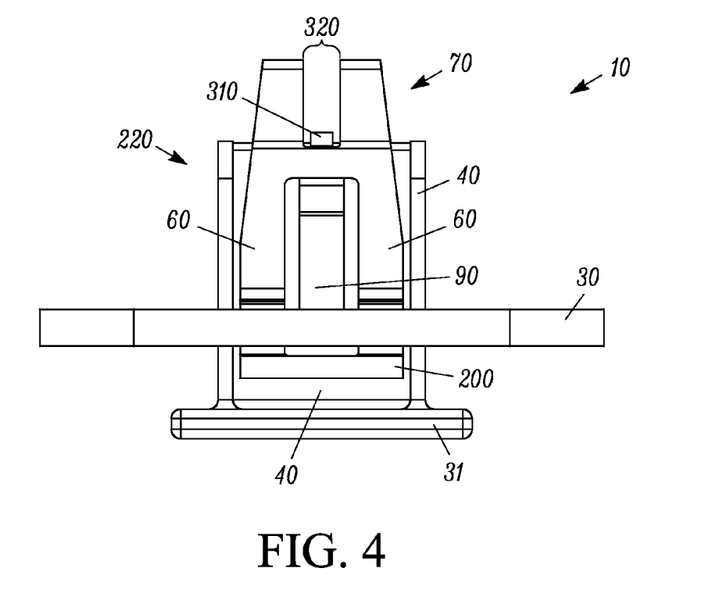
FIG. 4 is a side view of the body panel assembly shown lengthwise according to one embodiment.

FIG. 4 is a side view of the body panel assembly 10 shown lengthwise according to one embodiment. According to one embodiment, the first engagement structure 30 is a part of a vehicle body or chassis or any suitable portion of a vehicle. For example, the fastener clip 20 may couple or otherwise suitably attach to the first engagement structure 30, such as a vehicle chassis, structural framework, body panel, wall, substrate or any other suitable object. Additionally, the first engagement structure 30 may include a suitable plate, a panel, another body panel or any structure into which the fastener clip 20 is inserted. The fastener clip 20 provides a high level of fastening force and is ideally suited to all heavy and light duty applications, including applications involving fastening relatively large, heavy, and/or critical body panels to the vehicle chassis or any other suitable "heavy duty" applications.

Figure 5:
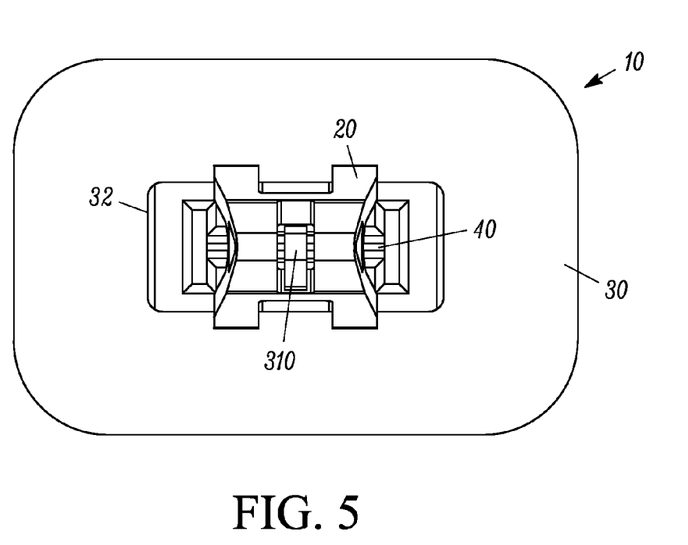
FIG. 5 is a top view of the body panel assembly according to one embodiment.

FIG. 5 is a top view of the body panel assembly 10. The fastener clip 20 is operatively inserted into the hole 32 defined in the first engagement structure 30. The hole 32 may have any shape, such as a circle, a square, a rectangle, a pentagon, hexagon, a polygon, an n-sided polygon where n is a whole number, an ellipse and/or an oval or any suitable shape. Further, the inner perimeter of the hole 32 has a rim 50 for engaging the fastener clip 20. According to one embodiment, the second engagement structure 40 further includes a mounting plate 60, having a pattern to facilitate mounting of the fastener clip 20 either with or without a fastener 70 such as a screw, a bolt, a rivet, a pin, a fastener clip or any other suitable fastener.

It should be understood that the implementation of other variations and modifications of the body panel assembly 10 and its various aspects shown in the figures described will be apparent to those having ordinary skill in the art, and that the invention is not limited by these specific embodiments described. For example, the fastener clip 20 may be coupled to the first engagement structure 30 in any suitable manner and during any stage of assembly. Further, the fastener clip 20 may be coupled to the second engagement structure 40 on a side, bottom or top of the second engagement structure 40 or on any other suitable part of the second engagement structure 40, such as on an interior trim piece inner surface of the body panel 31, or any part of any tower or post.

Figure 6:
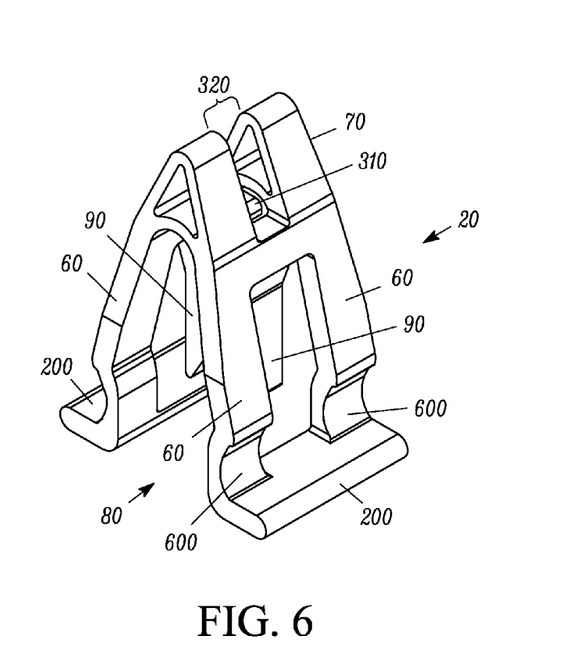
FIG. 6 is a perspective view of a fastener clip according to one embodiment.

FIG. 6 is a perspective view of the fastener clip 20. The fastener clip 20 includes a pair of laterally offset legs 60 joined at a head portion 70. The legs 60 form a clip opening 80 at an opposite end of the head portion 70 to allow entry of the post 40. According to the embodiment shown, the at least two arms 90 are attached to the pair of laterally offset legs 60. According to another embodiment, at least two arms 90 extend from each leg 60 for a total of four arms 90. Alternatively, one leg 60 may have one arm 90, while the other leg 60 has three arms 90. According to the embodiment shown, each leg is show with feet 200 to further stabilize the clip although feet 200 are not necessary and thus are optional.

Figure 7:
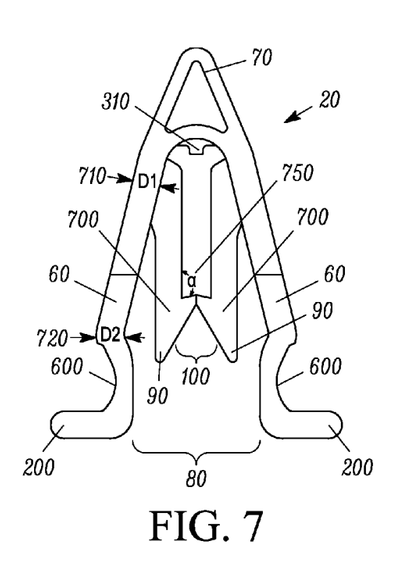
FIG. 7 is a side view of the fastener clip according to another embodiment.

FIG. 7 is a side view of the fastener clip 20 according to another embodiment. The pair of arms 90 are coupled to the pair of legs 60 adjacent to the head portion 70 such that the arms 90 project toward the clip opening 80, to create a frictional opening 100, 1060 upon insertion or withdrawal of the post 40 such that the post 40 causes a non-compressive force between the arms 90 when the post 40 is withdrawn. For example, the pair of arms 90 are operative to engage the post (or tower) 40 such that the pair of arms 90 engage the post 40 on the body panel structure 31.

Figure 10:
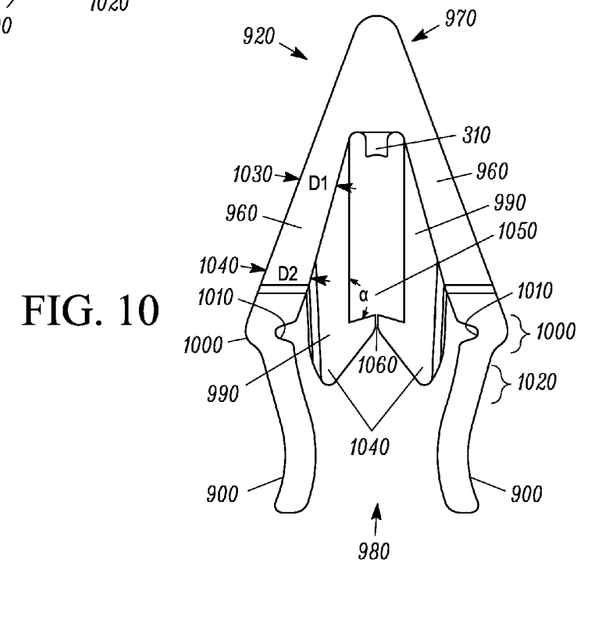
FIG. 10 illustrates a side view of the fastener clip according to one embodiment.

According to the embodiment, a pair of opposing projections 700 (knuckles) located at the end of each corresponding arm 990, such that the projections 700 point to each other to create the frictional opening 100, 1060 (FIG. 10). The pair of opposing projections 700 may have any suitable length or may be at different distances away from the pair of arms 90 and/or at different angles ($\alpha$ 750, 1050. For example, at least one of the projections 700, 1040 (FIG. 10) forms an angle ($\alpha$ 750, 1050 less than 90 degrees with the corresponding arm (acute angle), however any suitable angle ($\alpha$ 750, 1050 and length may be used. Further, the projections 700 may take the form of a hook, a loop, a prong, stair steps, ribs and may even interlock and/or have any suitable form or shape. Arms 90 and/or projections 700 may further be located in any position and in any direction in order to further provide additional stability while, for example, pivoting or rotation of the arms 90 relative to the pair of legs 60. The pair of arms 90/projections 700 dig in and further engage the post or tower 40 on the engage body panel structure 31 as the extraction force further increases. As is discussed elsewhere, according to one embodiment, the post 40 engages the projections 700 and causes a non-compressive force between the arms 90, 909 when the post is withdrawn.

The pair of arms 90 move substantially independently from the pair of legs 60. According to one embodiment, a length of the pair of arms 90 is substantially the same as a length of the pair of legs 60, such that the insertion force of the post 40 is substantially independent from an engagement of the legs 60 within a slot or hole 32 of the first engagement structure 30. In other words, the insertion and/or withdrawal force of the post 40 and arms 90 is substantially independent from the insertion and/or withdrawal force of legs 60 and slot 32. In contrast, conventional fasteners have shorter, stubbier arms and/or legs, where arm length is about 10% to 45% the length of leg length, thus increasing insertion force. As a result, the insertion and/or withdrawal force with a post is affected by insertion and/or withdrawal with the slot 32.

According to one embodiment, the pair of arms 90 are about 50% to 100% of the length of the pair of legs 60 and as such are substantially the same length. According to an alternative embodiment, the pair of arms 90 are 11% to 200% of the length of the pair of legs 60 and as such are substantially the same length. For example, lengthening the arms 90 decreases the insertion force for entry into the post 40 while lengthening the legs 60 decreases the insertion force for entry into the chassis slot 32 since increasing length provides more leverage. Additionally, the independent arms 90 allow the designer to select any suitable retention force by adjusting the length of the arms 90. The pair of arms 90 move substantially independently from the pair of legs 60 and thus the pair of arms 90 may engage the post 40 whether the pair of legs 60 are inserted into a slot 32 of the first engagement structure 30 or not. For example, the independent pair of arms 90 provide easy insertion force while maintaining a high level of extraction force. Thus, since the pair of arms 90 are independent from the pair of legs 60, the designer has the freedom to design the desired level of insertion force and extraction force. For example, lengthening the arms 90 decreases the insertion force for entry into the post 40 while lengthening the legs 60 decreases the insertion force for entry into the chassis slot 32 since increasing length provides more leverage. Other features may be implemented, such as varying the thickness of the legs 60 and/or arms 90 and/or adding ribs or other strengthening or weakening features. According to one embodiment, the length of the pair of arms 90 is between 50% and 100% the length of the legs 60; however the length of the arms 90 may be between 25% to 200% or any suitable length.

According to one embodiment, the arms 90 and/or legs 60 may be tapered to further allow greater movement of the legs 60 and/or arms 90. FIG. 7, not drawn to scale, illustrates that the upper portion of leg 60 has a thickness D1 710, 1030 that is less than a lower portion of leg 60 D2 720, 1040. Alternatively, D1 710, 1030 may be thicker than D2 720, 1040. Substantially tapered merely refers to any suitable difference or degree in thickness between D1 710, 1030 and D2 720, 1040. Any portion of the fastener clip 20 may be tapered including, the arms 90, projections 700, feet 200, depression 600 or any suitable portion. The independent arms provide easy insertion force while maintaining a high level of extraction force. Thus, since the arms 90 are independent from the legs 60, the designer of the fastener clip 20 has the freedom to design the desired level of insertion force and extraction force. For example, increasing the taper 720/710, 1040/1030 decreases the insertion force for entry into the post 40 while increasing the legs 60 decreases the insertion force for entry into the chassis slot 32 since increasing taper weakens the fulcrum or pivot point. Additionally, the independent arms 90 allow the designer to select any suitable retention force by adjusting the size and/or amount of the taper.

Each leg 60 includes at least one depressed portion 600. The depressed portion 600 is formed on each leg 60, such that each depressed portion 600 is operative to engage a portion of the hole 32 defined in the first engagement structure 30. The hole 32 may have any shape, such as a circle, a square, a rectangle, a pentagon, a hexagon, a polygon, an n-sided polygon where n is a whole number, an ellipse and/or an oval or any suitable shape.

The depressed portion 600 may include, for example, an abrupt edge, a gradual angled edge, such as a curve, a single angled edge, a discrete multiangled edge or a pointed edge. The depressed portion 600 is formed on the depressed portion 600 of each leg 60 so as to engage the hole 32 to increase an extraction force for the fastener clip 20 from the hole 32 formed on the first engagement structure 30. The depressed portion 600 may be sized to suitably engage hole 32 of the first engagement structure 30 in order to obtain the desired level of extraction force. According to one embodiment, the depressed portion 600 may be a depression formed on legs 60. For example, the depressed portion 600 may be formed by stamping legs 60 to form the depressed portion 600. The size and shape of the depressed portion 600 may be formed in any suitable manner in order to permit relatively easy insertion of the fastener clip 20 into the first engagement structure 30 while increasing the extraction force. According to one exemplary embodiment, the coupling force between fastener clip 20 and the first engagement structure 30 may be, for example, about 5 to 15 lbs., while the extraction force may be about 20 to 50 lbs. or more.

Figure 8:
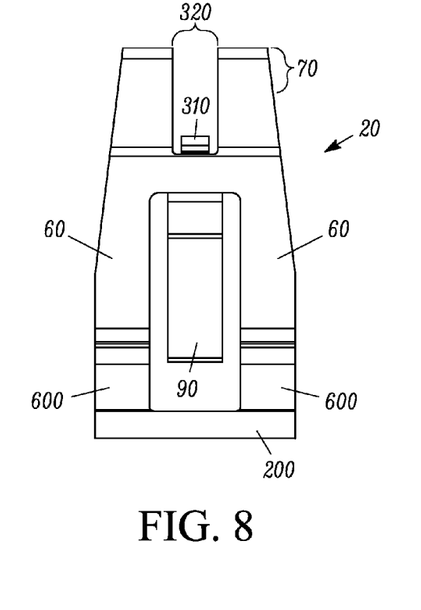
FIG. 8 is another side view of the fastener clip shown in FIG. 7 rotated 90 degrees.

FIG. 8 is another side view of the fastener clip 20 shown in FIG. 7 rotated 90 degrees. According to one embodiment, the depressed portion 600 of the leg 60 engages a rim 50 formed by the hole 32 within the first engagement structure 30. The depressed portion 600 may further include an edge formed at one or both ends of the depressed portion 600 to include either a single curvature or multiple curvatures in order to engage the rim 50. The amount of curvature, the depth of the depression, the width of the depression and the number of depressions may be sized in order to provide the desired level of extraction force due to the frictional engagement between any portion of the depressed portion 600 and the rim 50 of the first engagement structure 30. Edges of the depressed portion 600 may include prongs, ribs, teeth or any other suitable structure for complementary engagement with the first engagement structure 30. The depressed portion 600 may form edges of any angle or curvature, such as, for example, zero degrees, thirty degrees, forty-five degrees, sixty degrees, ninety degrees, one hundred forty-five degrees and so on. For example, the depressed portion 600 may frictionally engage the rim 50 with sufficient springing force in order to compensate for both production tolerances within the hole 32 of the first engagement structure 30 and also to compensate for thermal expansion, vibrations and any other conditions over very long periods of time. As a result, fastener clip 20 may reliably attach to the second engagement structure 30 to the first engagement structure 30 via a secure coupling over long periods of time.

According to one embodiment, the depressed portion 600 includes a depression dimple formed by including a gap between one or more stampings so that the depressed portion includes a dimple or lip for further increasing the frictional engagement with the first engagement structure 30. Alternatively, the depressed portion 600 may include two consecutive curved depressions.

According to this embodiment, the depressed portion 600 and/or the feet 200 secures each side of the fastener clip 20 to the first engagement structure 30. The depressed portion 600 and/or the feet 200, according to one embodiment, may provide a springing force when the fastener clip 20 is inserted into the hole 32 of the first engagement structure 30. The depressed portion 600 and/or the feet 200 may provide, for example, a clamp load when the depressed portion 600 and/or the feet 200 engages the outer surface of the first engagement structure 30. Accordingly, the depressed portion 600 of the legs 60 engages the outer surface of the first engagement structure 30 when the feet 200 engage the rim 50 and/or the inner portion of the first engagement structure 30. The springing force provided by the depressed portion 600 and/or the feet 200 may further securely engage and stabilize the fastener clip 20 when inserted into the first engagement structure 30.

According to one embodiment, the fastener clip 20 is made of: plastic, acetal, polyacetal, polyoxymethylene, nylon, fiberglass and/or carbon fiber, however any suitable material may be used in any combination such as steel, tin and/or any suitable metal. For example, the fastener clip 20 may be formed from injection molding or any suitable process. The fastener clip 20 may be molded from plastic without the need for action. Thus, the fastener clip 20 may be formed from a single injection step of injection molding.

According to one embodiment, the fastener clip 20 may be formed by plastic injection molding. Alternatively, the fastener clip 20 may be formed from a metal strip of sheet metal, such as steel, aluminum, magnesium, brass or any suitable material. For example, the stamping for the fastener clip 20 may be formed from a strip of sheet metal on a progressive die. The steps employed to form the fastener clip 20 may include blanking to cut a desired shape in the strip of sheet metal while maintaining a carrying tab to facilitate progressively moving the strip of sheet metal to the next die. Other steps may include the formation of shear tabs and punches to form holes as channels, as is known in the art.

Each arm 90 and/or leg 60, for example, may be formed by a parallel fold line formed with the base portion 50. According to one embodiment, the fastener clip 20 is formed from a continuous solid structure, such as a sheet of steel, and then hardened, for example, by means of a heat treatment, as is known in the art. According to one embodiment, rubber, plastic, paint or any other suitable coating or covering may be applied to the fastener clip 20, for example around the feet 200, in order to reduce buzzing, squeaking and rattling (BSR), provide a water tight seal, an air tight seal and/or dampen vibrations. Although the fastener clip 20 is suitable with for use in an automobile chassis, one skilled in the art would readily find use of a fastener clip 20 and other applications, such as aircraft, spacecraft, boating or furniture, as well as in home and building construction.

Figure 9:
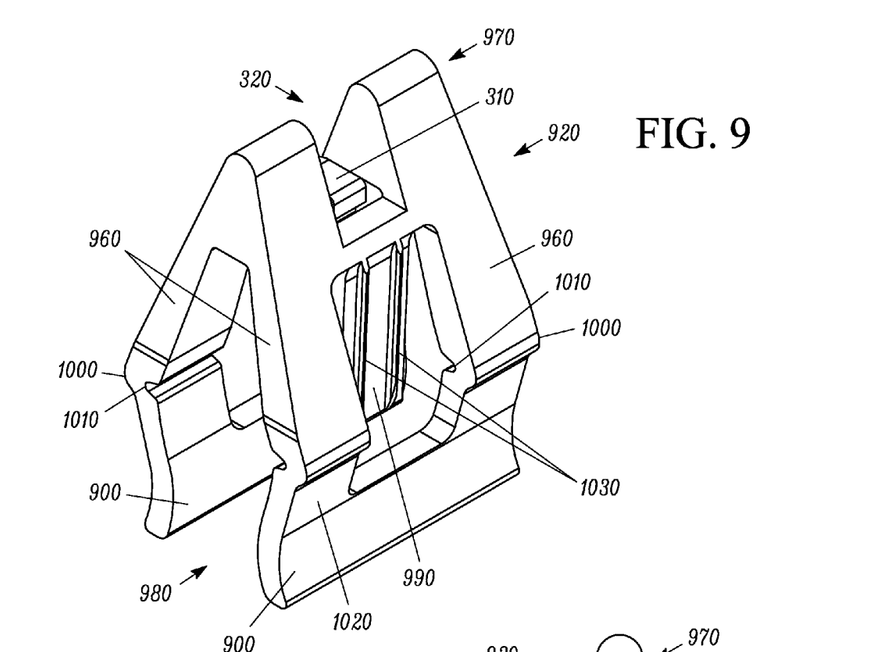
FIG. 9 is a perspective view of a fastener clip according another alternative embodiment.
Figure 11:
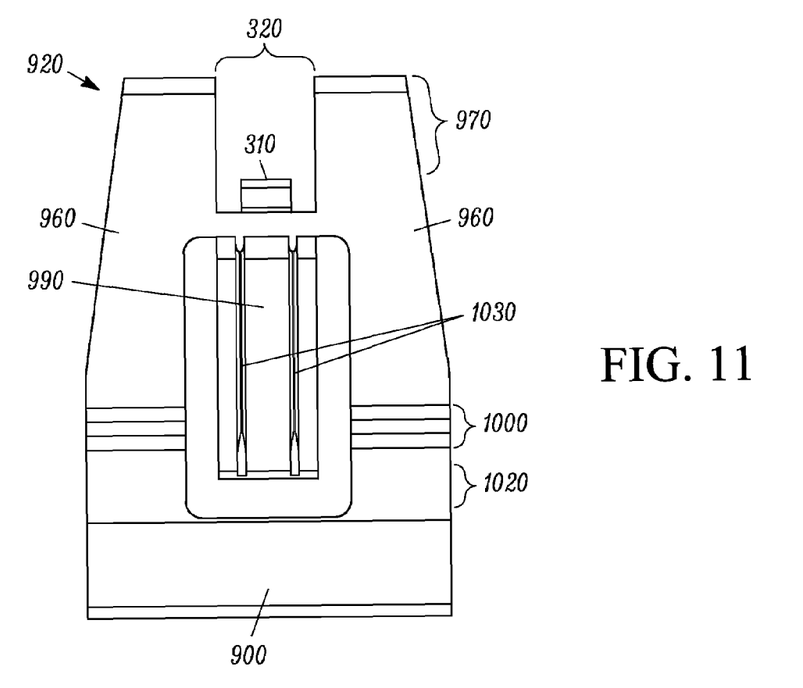
FIG. 11 is side view of the fastener clip according to the alternative embodiment.

FIGS. 9 through 11 illustrate an exemplary fastener clip 920 according to another embodiment. According to this embodiment, the fastener clip 920 may engage a narrower hole 32 than previously shown in FIG. 1. For example, hole 32 may be sized at 8 mm whereas fastener clip 920 may engage a hole sized at 6 mm however the fastener clip 920 may engage any suitably sized hole. As a result, the fastener clip 920 may be used in suitable applications where space is limited.

FIG. 9 is a perspective view of a fastener clip 20, 920 according another alternative embodiment. The fastener clip 920 functions in a manner similar to the fastener clip 20, except the fastener clip 920 may engage a narrower hole 32, or otherwise function differently as described below. The fastener clip 920 includes a pair of laterally offset legs 960 joined at a head portion 70. The legs 960 form a clip opening 980 at an opposite end of the head portion 970. Each pair of arm 990 is coupled to each leg 960 such that the pair of arms 990 are coupled to the pair of legs 960 adjacent to the head portion 970 such that the arms 990 move substantially independently from the pair of legs 960.

FIG. 10 illustrates a side view of the fastener clip 920. The pair of arms 990 project toward the clip opening 980 to create a frictional opening 1060 between opposing projections 1040 upon insertion or withdrawal of the post 40. The post 40 causes a non-compressive force between the arms 990 when the post 40 is withdrawn such that the arms 990 tend not to come together. Instead, the withdrawal force of the post 40 imparts a force substantially in-line with the pair of arms 990 upon insertion or withdrawal of the post 40. The withdrawal force may cause or tends to cause the arms 990 to substantially bend, pivot and/or flex due to the resulting torque or moment force applied by the post 40 at a distance equal to a moment arm from projections 1040 to an intersecting axis along the arms 990 where the arms 990 attach to the legs 960. According to one embodiment as described with reference to FIG. 11 below, ribs 930 strengthen arms 990 to resist or counter act the resulting torque.

An outer hinge 1000 and an inner hinge 1010 allow the lower part of the legs 960 and the foot 900 to bend or rotate relative to each other when inserted into hole 32. According to one embodiment, the outer hinge 1000 has more material, such as a bulge, curve, rib and/or any suitable strengthening feature, and the inner hinge 1010 has less material, such as a cavity, notch, perforation, or any suitable inner hinge feature. The outer hinge 1000 and the inner hinge 1010 allow the legs 960 to straighten or become less bent such that the legs 960 pass through the hole 32 past the outer hinge 1000. Among other advantages, the legs 960 engage the hole 32 to move closer to each other to permit insertion of the fastener clip 20, 920 causing the legs 960 to substantially bend and/or pivot toward each other. Thus, outer hinge 1000 and the inner hinge 1010 allow the upper and lower portion of the legs 960 to straighten to permit insertion and extraction of the fastener clip 20, 920. According to one embodiment, the hinge 1000 and/or depression 1020 provide a suitable fastening force on the fastener clip 20, 920, for example, to provide a desired insertion and extraction force.

The hinge 1000, 1010 and/or depression 1020 on the fastener clip 920 compensate for variations in panel thickness of the first engagement structure 30 and/or body panel 31, and further compensate for variations in the size, such as the diameter of the hole 32 defined in the first engagement structure 30. The fastener clip 20, 920, therefore adapts to variations and production tolerances, such as variations in the hole 32 formed within the vehicle chassis and variations in body panels. Whereas, in the prior art, when the legs 960 and/or arms 990 of the fastener clip became damaged or stripped, conventional fastener clips 920 are rendered useless and, even worse, remains unfastened. According to one embodiment, the fastener clip 20, 920 is made of plastic, acetal or any other suitable material to further reduce squeaks, buzzing and rattling. Therefore, conventional fastener clips 920 are not secured in the hole 32, making them susceptible to disengagement, rattles, buzzing, squeaks and/or other annoyances. In contrast, the fastener clip 20, 920 possesses the ability to increase the fastening force of the fastener clip 20, 920, thereby reducing or completely eliminating the possibility of rendering the fastener clip 20, 920 useless. Further, the fastener clip 20, 920 may adapt to changes in thermal expansion, especially due to differences in thermal expansion rates between the metal vehicle chassis and plastic components, such as body panels attached to the metal vehicle chassis. Yet another advantage is that the fastener clip 20, 920 is relatively easy to manufacture, using relatively inexpensive manufacturing processes and materials. The use of the fastener clip 20, 920 decreases production costs, increases productivity and efficiency and decreases overall assembly costs. Since the fastener clip 20, 920 securely attaches a body panel such as the instrument panel to the vehicle chassis, the fastener clip 20, 920 improves reliability both in the short term and in the long term, while further improving vehicle safety and quality.

Each leg 960 includes at least one depression 1020. The depression 1020 formed on each leg 960 is operative to engage a portion of the hole 32 defined in the first engagement structure 30. The depression 1020 is similar to the depressed portion 600 as previously described. According to the embodiment shown, each of the pair of laterally offset arms 990 is coupled through at least four legs 960 in a similar manner as previously shown with regards to FIGS. 1-8.

FIG. 11 illustrates one embodiment of ribs 930 on strengthen arms 990 to resist or counter act a resulting torque when the post 40 is withdrawn from the arms 990. The ribs function to increase the withdrawal force and thus thicker and/or wider ribs may be formed depending on the desired withdrawal force required. Other suitable features may be formed on the arms 990 in order to further increase the withdrawal force. According to one embodiment, tabs or projections may be formed on the arms 990 to engage the legs 960, hinge 1010, feet 900 or the first engagement structure 30. For example, the tabs or projections further resist spreading of the arms 990 when the post 40 is withdrawn to further increase the withdrawal force.

Figure 12:
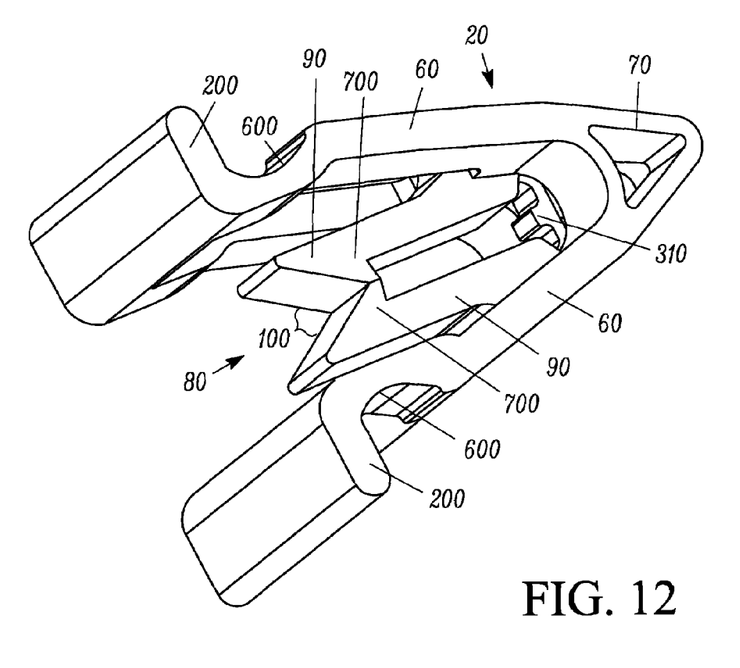
FIG. 12 is a bottom view of the fastener clip according to yet another alternative embodiment.

FIG. 12 is a bottom perspective view of the fastener clip 20 according to yet another alternative embodiment. According to one embodiment, the fastener clip 20 further includes the spring finger 310 formed in the head portion 70 wherein the spring finger 310 is operative to engage the post 40 when inserted. The spring finger 310 controls the distance the post 40 may be inserted past the frictional opening 100, 1060. The spring finger 310 springs in response to contact with the post 40. For example, the post 40 is operative to compresses the spring finger 310 upon insertion and contact with the spring finger 310 and thus the spring finger 310 reduces movement and/or play between the post 40 and the arms 90 and/or the spring finger 310. According to one embodiment, a spring window 320 is formed in the head portion 970 such that the spring finger 310 bridges the pair of laterally offset legs 960.

Figure 13:
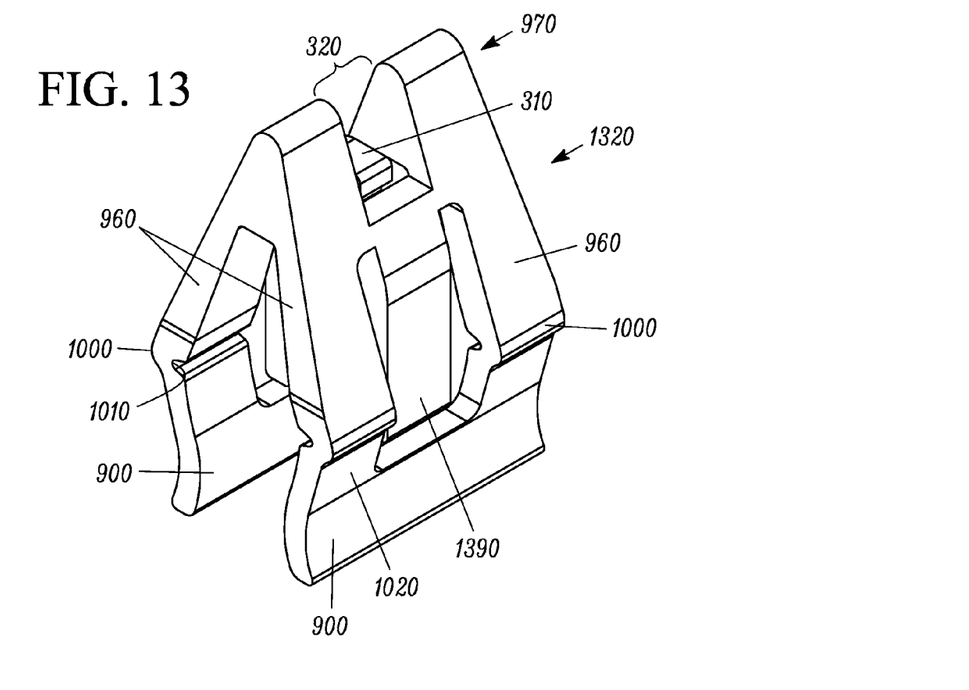
FIG. 13 is a top perspective view of a fastener clip according to yet another embodiment.

FIG. 13 is a top perspective view of a fastener clip 1320 according to yet another embodiment. The fastener clip 1320 according to this embodiment has arms 1390 that are operative to engage the first engagement structure 30 when the post 40 is withdrawn from arms 1390. Thus, the outer portion of the arms 1390 is substantially flush with the outer part of the legs 960. According to one embodiment, substantially flush means that the arms 1390 have a gap with the first engagement structure 30 such that the arms 1390 do not substantially engage the first engagement structure 30 unless the post 40 is withdrawn. However, when the post 40 is withdrawn and the arms 1390 begin to spread, then the arms 1390 traverse the gap and engage the first engagement structure 30.

Figure 14:
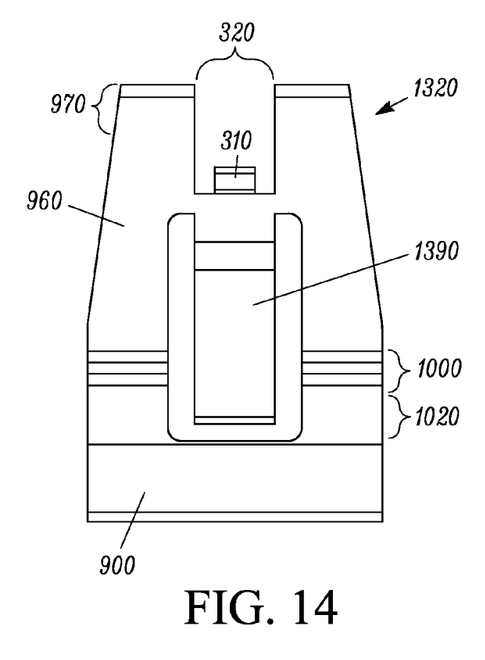
FIG. 14 is a side view of the fastener clip of FIG. 13 taken lengthwise.

FIG. 14 is a side view of the fastener clip 1320 taken lengthwise. According to one embodiment, the arms 1390 and or the legs 960 are tapered either lengthwise and/or widthwise.

Figure 15:
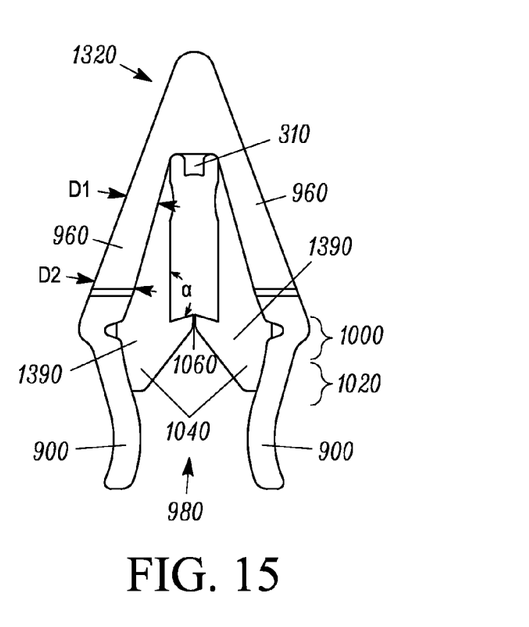
FIG. 15 is a lateral side view of the fastener clip of FIG. 13.

FIG. 15 is a side view of the fastener clip 1320. The substantially flush arms 1390 permit the fastener clip to be easily inserted onto post 40 to form a partial body panel assembly ready for attachment to a vehicle chassis. The substantially flush arms 1390 relatively easily expand to accommodate the post 40. Since the fastener clip 1320 is not yet attached to the first engagement structure 30, the substantially flush arms 1390 spread readily since the substantially flush arms 1390 do not frictionally engage the first engagement structure 30.

Figure 16:
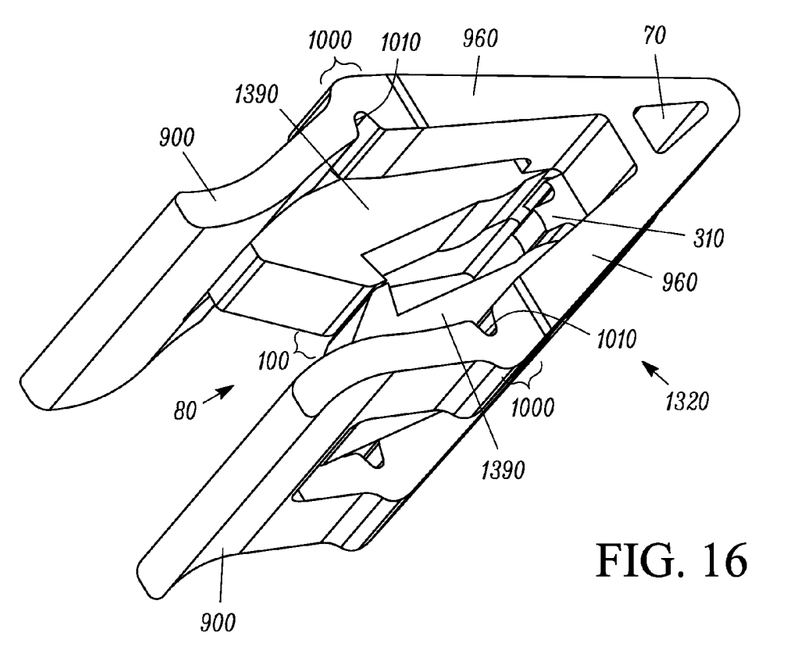
FIG. 16 is a bottom perspective view of the fastener clip of FIG. 13.

FIG. 16 is a bottom perspective view of the fastener clip 1320. According to one embodiment, the arms 1390 and or the legs 960 are tapered such that the arms 1390 and or the legs 960 are thicker at one end than another end.

Figure 17:
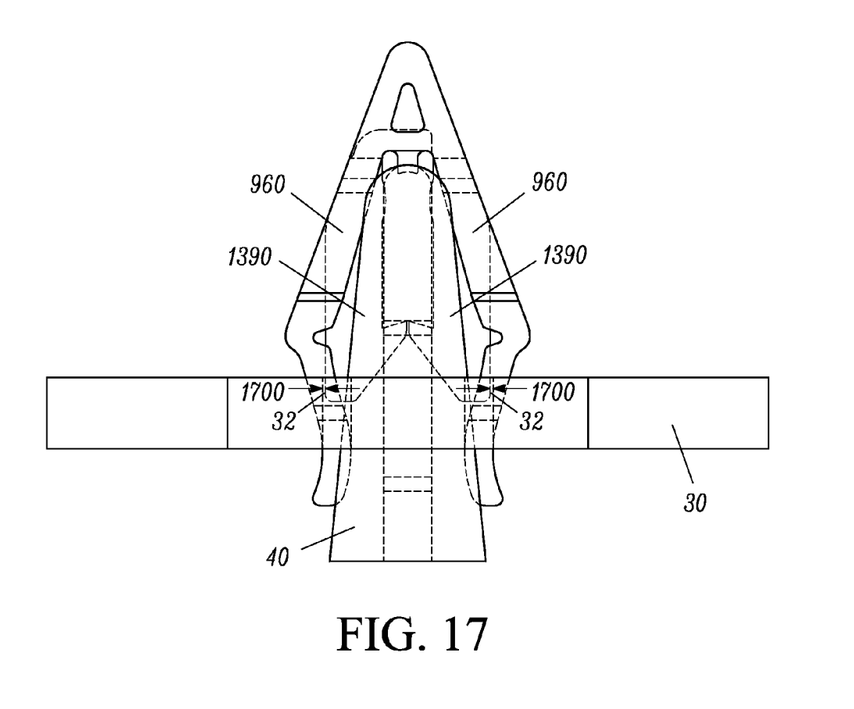
FIG. 17 is a side view of the fastener clip of FIG. 13 shown inserted into a first engagement structure.

FIG. 17 is a side view of the fastener clip 1320 shown inserted into a first engagement structure 30. The arms 1390 are shown with hidden lines so as to reveal the arms 1390 since the legs 960 would otherwise block the arms 1290. According to one embodiment, the arms 1390 may form any suitable gap 1700 with the legs 960. For example, the gap 1700 may be sized such that the distance from the outer side of the arms 1390 is slightly smaller than the diameter of the slot 32. Thus, the size of the gap 1700 may be such that the gap 1700 is smaller than then distance the arms 1390 spread would otherwise be when the post 40 is withdrawn from arms 1390. Depending on the arms 1390, the size of the gap 1700 also depends on the width of post 40 and any frictional opening 100, 1060 between the projections 1040. According to one embodiment, the gap is about 0.1 mm, for example, however any suitable gap size may be used. Thus, when the post 40 spreads the arms 1390, the arms 1390 can only spread as much as the slot 32 allows. Thus, each arm is squeezed so that the withdrawal force is increased. The withdrawal force may be selected based in the thickness of the arms 1390, the type of material used for the arms 1390, the shape of the projections 1040 and/or the size of the frictional opening 100, 1060 between the projections 1040.

Although the fastener clips 20, 920, 1320 are described at least for suitable engagement with the first engagement structure 30 such as an automobile chassis, one skilled in the art would readily find use of the fastener clip 20, 920, 1320 in other applications, such as aircraft, spacecraft, boating or furniture, home construction and building construction or any other suitable application.

Among other advantages, the fastener clips 20, 920, 1320 relatively easily facilitate attachment of the second engagement structure 40, 31 such as an interior or exterior body panel, to the first engagement structure 30, such as the vehicle chassis. As previously described, the arms 90, 990 move substantially independently from the pair of legs 60, 960 and thus the arms 90, 990 may engage the post 40 whether the legs 60, 960 are inserted into the slot 32 or not. Thus, the independent arms 90, 990 provide easy insertion force while maintaining a high level of extraction force. Further, the depressed portion 600, 1020 adapts to variations and production tolerances, such as variations in the slot 32 formed within the vehicle chassis and variations in body panels. Each leg 60, 960 independently engages the slot 32 of the vehicle chassis and adapts to changes, such as chassis flexing and vibrations of a wide range of amplitudes and frequencies. Further, the depressed portion 600, 1020 on each leg 60, 960 permits relatively easy insertion of the fastener clips 20, 920, 1320 into the slot 32 formed within the vehicle chassis 30 while providing a relatively high level of extraction force from the vehicle chassis. As a result, attachment of the body panel assembly 10 onto the vehicle chassis 30 requires a relatively low level of insertion force, and as a result provides many ergonomic advantages. For example, the relatively low level of insertion force is particularly advantageous for assembly line operators who repetitively insert body panels onto the vehicle chassis. The relatively low level of insertion force required for inserting the body panel assembly 10, 800 into the vehicle chassis results in fewer injuries to the assembly workers, including injuries related to repetitive stress syndrome.

The relatively high level extraction force characteristic of the fastener clip 20, 920, 1320 securely attaches the body panel 31 such as an interior trim piece to the vehicle chassis as previously stated. Further, the fastener clip 20, 920, 1320 continually adapts to changes in environmental conditions such as vehicle flexing vibration and thermal expansion. For example, the fastener clip 20, 920, 1320 may adapt to changes in thermal expansion, especially due to the differences in thermal expansion rates between dissimilar metals or materials. This typically occurs when the vehicle chassis and/or plastic components such as the interior trim panels are attached to the metal vehicle chassis. Further, the gap 1700 allows the fastener clip 20, 920, 1320 to attach to the post 40 on a second engagement structure 31 such as a body panel with sufficient force so that both the body panel and fastener clip, as an assembly, may be shipped for final assembly onto a first engagement structure 30 such as a vehicle chassis. As previously stated, once the panel assembly is attached to the vehicle chassis, the arms 1390 substantially flush with the slot 32 to provide even higher withdrawal force. For example, if the body panel assembly is pulled, then the body panel assembly detaches from the vehicle chassis with the fastener clip 20, 920, 1320 still attached to the post 40. Once the body panel assembly is removed from the vehicle chassis, the arms 1390 may be spread sufficiently to remove the fastener clip 1320 without damaging the fastener clip 1320 and/or the body panel or the vehicle chassis. Yet another advantage is that the fastener clip 20, 920, 1320 may be made with few injection molding steps, such as four, three, two or even one step and thus is relatively easy to manufacture using relatively inexpensive manufacturing processes and materials. The use of the fastener clip 20, 920, decreases production costs, decreases worker injury, increases productivity and efficiency and decreases overall assembly cost. The fastener clip 20, 920 securely attaches the body panel 31 to the vehicle chassis 30, such that the fastener clip 20, 920 improves fastening reliability both in the long term and in the short term while further improving vehicle safety.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. Fastener clip comprising:
   a pair of laterally offset legs joined at a head portion, wherein the legs form a clip opening at an opposite end of the head portion;
   a pair of arms coupled to the pair of legs adjacent to the head portion such that the pair of arms move substantially independently from the pair of legs, wherein the arms project toward the clip opening to form a frictional opening and to permit insertion or withdrawal of a post such that the post causes a non-compressive force between the arms when the post is withdrawn; and
   a spring finger formed in the head portion.

2. The fastener clip of claim 1, wherein a length of the pair of arms is substantially the same length as the pair of legs.

3. The fastener clip of claim 1, wherein the spring finger is operative to engage the post when inserted such that the post may be inserted a predetermined distance past the frictional opening.

4. The fastener clip of claim 1, wherein the head portion forms a point.

5. The fastener clip of claim 1, further including a projection located at the end of each corresponding arm, such that the projections point to each other to create the frictional opening.

6. The fastener clip of claim 5, wherein the at least one projection forms an angle less than 90 degrees with the corresponding arm.

7. The fastener clip of claim 1, wherein the pair of arms are substantially flush with the legs such that the arms engage a first engagement structure when the post is withdrawal.

8. The fastener clip of claim 1, wherein the post imparts a force substantially in-line with the pair of arms upon insertion or withdrawal of a post.

9. The fastener clip of claim 1, wherein the fastener clip comprises at least one of: plastic, acetal, polyacetal, polyoxymethylene, nylon, fiberglass and carbon fiber.

10. The fastener clip of claim 1, further comprising a depressed portion on each of the legs wherein at least one depressed portion is operative to engage a portion of the hole.

11. The fastener clip of claim 10, wherein the depressed portion includes at least one of: an abrupt edge, a gradual-angled edge, a single-angled edge, a discrete multiangled edge and a pointed edge.

12. The fastener clip of claim 1, wherein least one of: the legs and the arms, is tapered.

13. A fastener assembly comprising:
    a body panel including a post;
    a fastener clip comprising:
       a pair of laterally offset legs joined at a head portion, wherein the legs form a clip opening at an opposite end of the head portion;
       a pair of arms coupled to the pair of legs adjacent to the head portion such that the pair of arms move substantially independently from the pair of legs, wherein the arms project toward the clip opening to form a frictional opening and to permit insertion or withdrawal of the post such that the post causes a non-compressive force between the arms when the post is withdrawn; and
       a spring finger formed in the head portion.

14. The fastener assembly of claim 13 wherein a length of the pair of arms is substantially the same length of the pair of legs, and wherein least one of: the legs and the arms, is tapered.

15. The fastener assembly of claim 13 wherein the spring finger is operative to engage the post when inserted.

16. The fastener assembly of claim 13 further including a projection located at the end of each corresponding arm, such that the projections point to each other to create the frictional opening.

17. The fastener assembly of claim 16 wherein the at least one projection forms an angle less than 90 degrees with the corresponding arm.

18. The fastener assembly of claim 13 wherein the post imparts a force substantially in-line with the pair of arms upon insertion or withdrawal of a post.

19. The fastener assembly of claim 13 wherein the fastener clip comprises at least one of: plastic, acetal, polyacetal, polyoxymethylene, nylon, fiberglass and carbon fiber.

20. The fastener assembly of claim 13 further comprising a depressed portion on each of the legs.

21. A vehicle comprising:
   a vehicle chassis;
   a body panel comprising a post;
   a fastener clip operably fastened to a hole defined in the vehicle chassis comprising:
      a pair of laterally offset legs joined at a head portion, wherein the legs form a clip opening at an opposite end of the head portion;
      a pair of arms coupled to the pair of legs adjacent to the head portion such that the pair of arms move substantially independently from the pair of legs, wherein the arms project toward the clip opening to form a frictional opening and to permit insertion or withdrawal of the post such that the post causes a non-compressive force between the arms when the post is withdrawn; and
      a spring finger formed in the head portion.

22. The vehicle of claim 21 wherein a length of the pair of arms is substantially the same length of the pair of legs, and wherein least one of: the legs and the arms, is tapered.

23. The vehicle of claim 21 wherein the spring finger is operative to engage the post when inserted.

24. The vehicle of claim 21 wherein the fastener clip comprises at least one of: plastic, acetal, polyacetal, polyoxymethylene, nylon, fiberglass and carbon fiber.

25. A fastener clip comprising:
   a pair of laterally offset legs joined at a head portion, wherein the legs form a clip opening at an opposite end of the head portion;
   a pair of arms coupled to the pair of legs adjacent to the head portion such that the pair of arms move substantially independently from the pair of legs, wherein the arms project toward the clip opening to form a frictional opening and to permit insertion or withdrawal of a post such that the post causes a non-compressive force between the arms when the post is withdrawn; and
   a spring window formed in the head portion such that a spring finger bridges the pair of laterally offset legs and wherein the spring finger springs in response to contact with the post.

26. The fastener clip of claim 25 wherein the spring finger controls the distance the post may be inserted past the frictional opening.

27. The fastener clip of claim 25, wherein the pair of arms are substantially flush with the legs such that the arms engage a first engagement structure when the post is withdrawal.

* * * * *